US007710371B2

(12) United States Patent
Mei et al.

(10) Patent No.: US 7,710,371 B2
(45) Date of Patent: May 4, 2010

(54) VARIABLE VOLUME BETWEEN FLEXIBLE STRUCTURE AND SUPPORT SURFACE

(75) Inventors: Ping Mei, Palo Alto, CA (US); Jurgen Daniel, Mountain View, CA (US); James B. Boyce, Los Altos, CA (US); Kathleen Dore Boyce, legal representative, Ashland, OR (US); Jackson Ho, Palo Alto, CA (US); Rachel Lau, San Jose, CA (US); Yu Wang, Union City, CA (US)

(73) Assignee: Xerox Corporation, Norwalk, CT (US)

( * ) Notice: Subject to any disclaimer, the term of this patent is extended or adjusted under 35 U.S.C. 154(b) by 1165 days.

(21) Appl. No.: 11/014,490

(22) Filed: Dec. 16, 2004

(65) Prior Publication Data

US 2006/0131163 A1 Jun. 22, 2006

(51) Int. Cl.

| | |
|---|---|
| ***G09G 3/34*** | (2006.01) |
| ***C25B 9/00*** | (2006.01) |
| ***F04B 17/00*** | (2006.01) |
| ***B41J 2/14*** | (2006.01) |
| ***G02F 1/153*** | (2006.01) |
| ***H04R 19/00*** | (2006.01) |

(52) U.S. Cl. ........................ 345/85; 204/253; 204/255; 204/257; 204/252; 417/413.1; 347/49; 359/267; 359/291; 381/176; 381/399

(58) Field of Classification Search ................. 204/195, 204/295, 252–258; 347/1–109; 417/413.1; 359/237–324; 345/85; 381/167, 398–399

See application file for complete search history.

(56) References Cited

U.S. PATENT DOCUMENTS 4,321,432 A * 3/1982 Matsutani et al. ........... 381/174

(Continued)

OTHER PUBLICATIONS

Doany, F.E., Narayan, C., "Laser release process to obtain freestanding multilayer metal-polyimide circuits," IBM J. Res. Develop., vol. 41, No. 1-2, Jan./Mar. 1997, pp. 151-157.

(Continued)

*Primary Examiner*—Alex Noguerola
*Assistant Examiner*—Bach T Dinh
(74) *Attorney, Agent, or Firm*—Leading-Edge Law Group, PLC; Matthew R. Osenga

(57) ABSTRACT

Cells can include variable volumes defined between a flexible structure, such as a polymer layer, and a support surface, with the flexible structure and support surface being attached in a first region that surrounds a second region in which they are unattached. Various adhesion structures can attach the flexible structure and the support surface. When unstretched, the flexible structure can lie in a flat position on the support surface. In response to a stretching force away from the support surface, the flexible structure can move out of the flat position, providing the variable volume. Electrodes, such as on the flexible structure, on the support surface, and over the flexible structure, can have charge levels that couple with each other and with the variable volume. A support structure can include a device layer with signal circuitry that provides a signal path between an electrode and external circuitry. One or more ducts can provide fluid communication with each cell's variable volume. Arrays of such cells can be implemented for various applications, such as optical modulators, displays, printheads, and microphones.

29 Claims, 9 Drawing Sheets

U.S. PATENT DOCUMENTS

| | | | | |
|---|---|---|---|---|
| 5,240,774 | A * | 8/1993 | Ogawa et al. | 428/411.1 |
| 5,452,878 | A * | 9/1995 | Gravesen et al. | 251/129.02 |
| 5,569,855 | A | 10/1996 | Schomburg et al. | |
| 5,777,329 | A | 7/1998 | Westphal et al. | |
| 6,143,442 | A * | 11/2000 | Takahashi et al. | 429/179 |
| 6,148,635 | A * | 11/2000 | Beebe et al. | 62/498 |
| 6,261,066 | B1 | 7/2001 | Linnemann et al. | |
| 6,364,466 | B1 | 4/2002 | Chen et al. | |
| 6,439,898 | B2 | 8/2002 | Chua et al. | |
| 6,554,404 | B2 | 4/2003 | Giere et al. | |
| 6,568,286 | B1 * | 5/2003 | Cabuz | 73/863.33 |
| 6,589,410 | B1 * | 7/2003 | Shoji et al. | 204/426 |
| 6,626,523 | B2 | 9/2003 | Giere et al. | |
| 6,856,718 | B2 | 2/2005 | Kane et al. | |
| 6,873,863 | B2 * | 3/2005 | Hiltunen | 455/575.1 |
| 6,934,435 | B2 | 8/2005 | Kane | |
| 7,050,040 | B2 | 5/2006 | Daniel et al. | |
| 7,136,216 | B1 | 11/2006 | Daniel et al. | |
| 7,195,465 | B2 | 3/2007 | Kane et al. | |
| 7,265,161 | B2 * | 9/2007 | Leatherdale et al. | 522/25 |
| 7,279,064 | B2 | 10/2007 | Daniel et al. | |
| 7,368,228 | B2 | 5/2008 | Weisberg | |
| 7,463,409 | B2 | 12/2008 | Daniel et al. | |
| 2002/0079495 | A1 * | 6/2002 | Sung | 257/72 |
| 2002/0092356 | A1 * | 7/2002 | Yamamoto et al. | 73/754 |
| 2003/0068231 | A1 * | 4/2003 | Cabuz et al. | 417/53 |
| 2003/0081074 | A1 | 5/2003 | Giere et al. | |
| 2003/0081302 | A1 | 5/2003 | Kane et al. | |
| 2003/0151647 | A1 | 8/2003 | Giere et al. | |
| 2003/0189622 | A1 | 10/2003 | Giere et al. | |
| 2004/0056245 | A1 * | 3/2004 | Thomas et al. | 257/40 |
| 2004/0096594 | A1 * | 5/2004 | Takeuchi et al. | 428/1.2 |
| 2004/0238821 | A1 * | 12/2004 | Yang | 257/72 |
| 2005/0133154 | A1 | 6/2005 | Daniel et al. | |
| 2005/0136359 | A1 | 6/2005 | Weisberg | |
| 2006/0132579 | A1 | 6/2006 | Daniel et al. | |
| 2006/0176675 | A1 * | 8/2006 | Bourns et al. | 361/780 |
| 2007/0268244 | A1 | 11/2007 | Chopra et al. | |
| 2007/0268562 | A1 | 11/2007 | Chopra et al. | |
| 2007/0268565 | A1 | 11/2007 | Chopra et al. | |
| 2009/0051646 | A1 | 2/2009 | Daniel et al. | |

OTHER PUBLICATIONS

Francais, O., Dufour, I., "Enhancement of elementary displaced volume with electrostatically actuated diaphragms: application to electrostatic micropumps," J. Micromech. Microeng., vol. 10, 2000, pp. 282-286.

Senturia, S.D., Microsysstem Design, Boston, Kluwer, 2001, pp. 502-507.

Fraunhofer, "Surface Macromachined Pressure Sensor Technologies," Institut Mikroelektronische Schaltungen und Systeme, Sep. 2002 (two pages).

Bakir, M. S., Reed, H. A., Mule, A. V., Jayachandran, J. P., Kohl, P. A., Martin, K. P., Gaylord, T. K., and Meindl, J. D., "Chip-to-Module Interconnections Using 'Sea of Leads' Technology," MRS Bulletin, Jan. 2003, pp. 61-63 and 66-67.

Fan, Z., Engel, J.M., Chen, J., Liu, C., "Parylene Surface-Micromachined Membranes for Sensor Applications," J. of Microelectromechanical Systems, vol. 13, No. 3, Jun. 2004, pp. 484-490.

Fahrenberg, J., Bier, W., Maas, D., Menz, W., Ruprecht, R., Schomburg, W.K., "A microvalve system fabricated by thermoplastic molding," published at the Web site http://www.iop.org/EJ/abstract/0960-1317/5/2/029 (2 pages), printed May 14, 2004.

Forschungszentrum Karlsruhe, Technik und Umwelt, Microsystem Technologies Program (PMT), "Amanda Process/Surface Micromachining, Molding and Diaphragm Transfer," (4 pages), printed May 14, 2004.

Bakir, M.S., Reed, H.A., Thacker, H.D., Patel, C.S., Kohl, P.A., Martin, K.P., and Meindl, J.D., "Sea of Leads (SoL) Ultrahigh Density Wafer-Level Chip Input/Output Interconnections for Gigascale Integration (GSI)," IEEE Transactions on Electron Devices, vol. 50, No. 10, Oct. 2003, pp. 2039-2048.

Keezer, D.C., Patel, C.S., Bakir, M.S., Zhou, Q., and Meindl, J.D., "Electrical Test Straegies for a Wafer-Level Packaging Technology," IEEE Transactions on Electronics Packaging manufacturing, vol. 26, No. 4, Oct. 2003, pp. 267-272.

* cited by examiner

*FIG. 1*
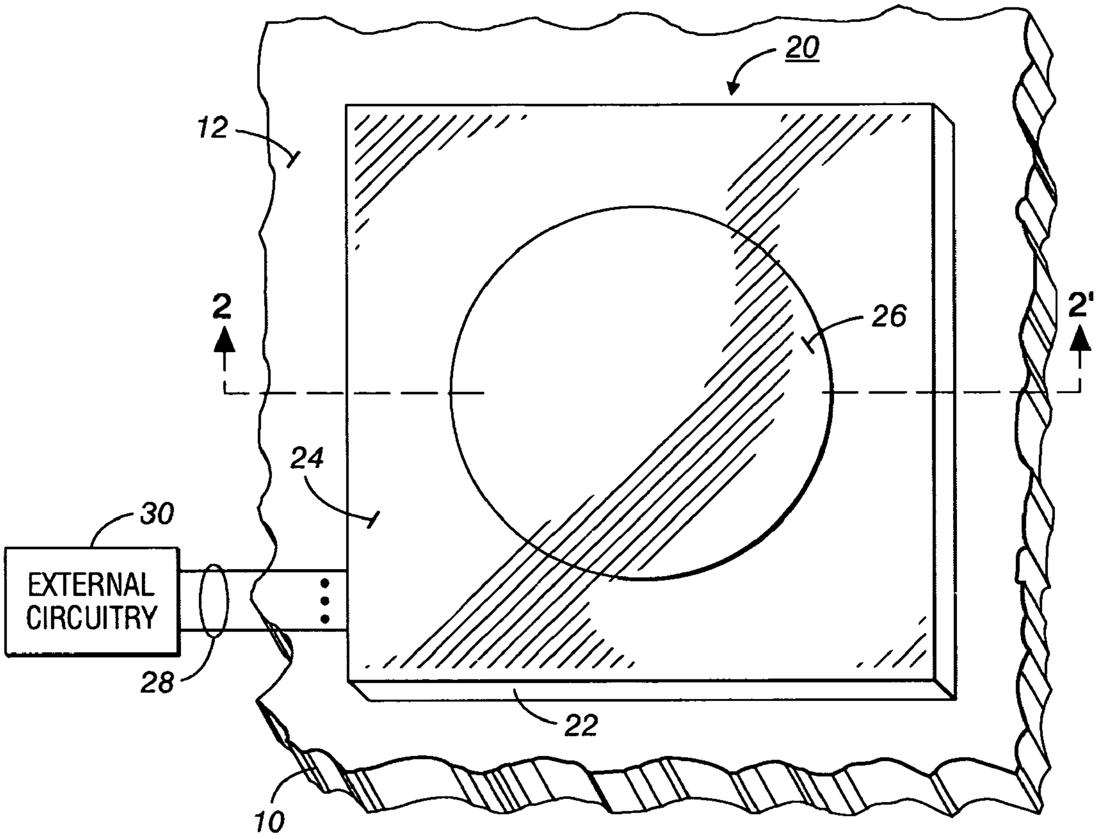
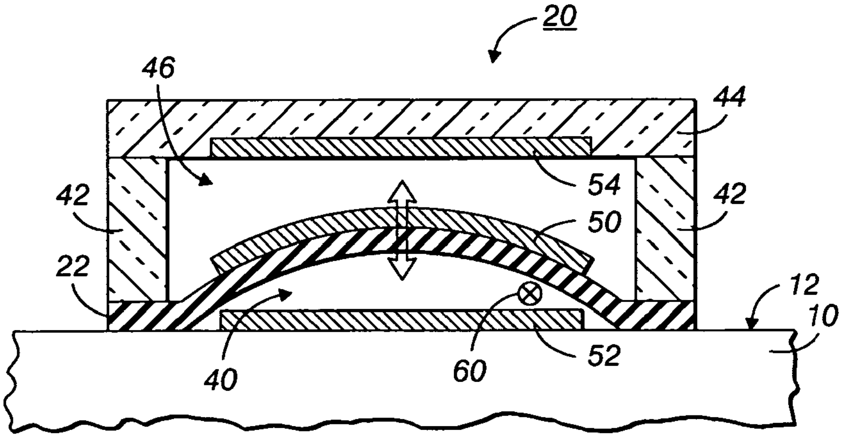
*FIG. 2*

FIG. 3
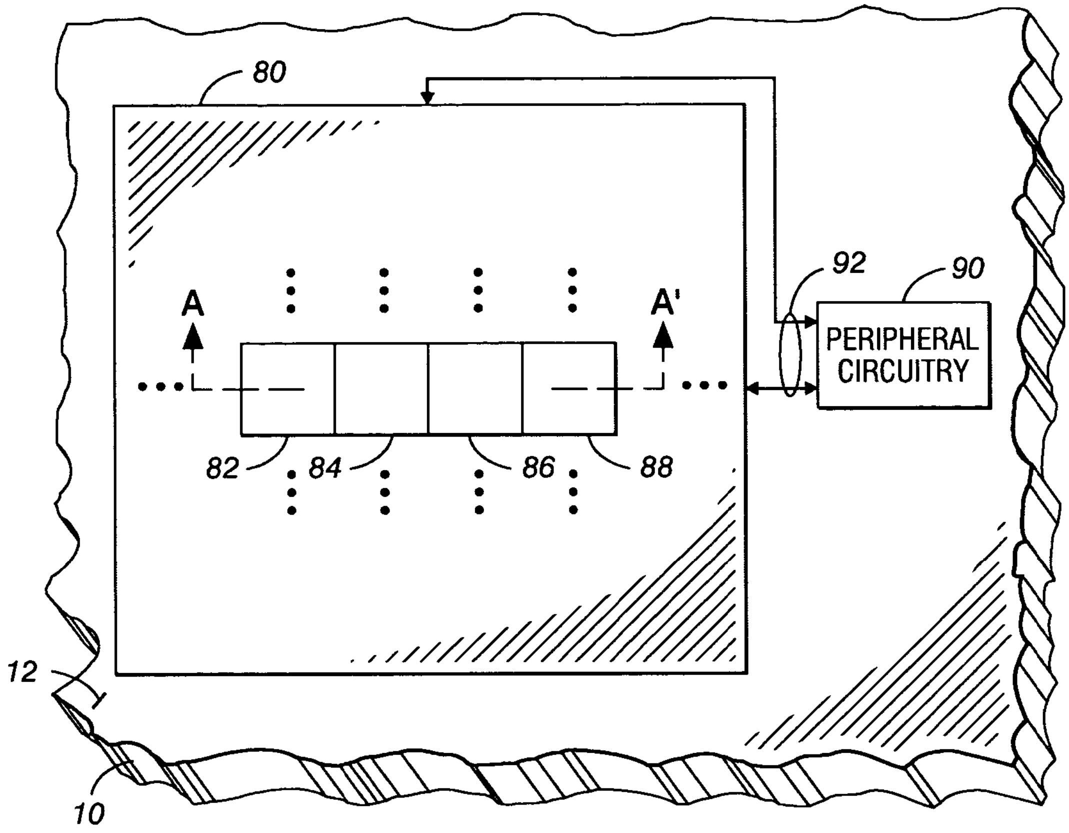
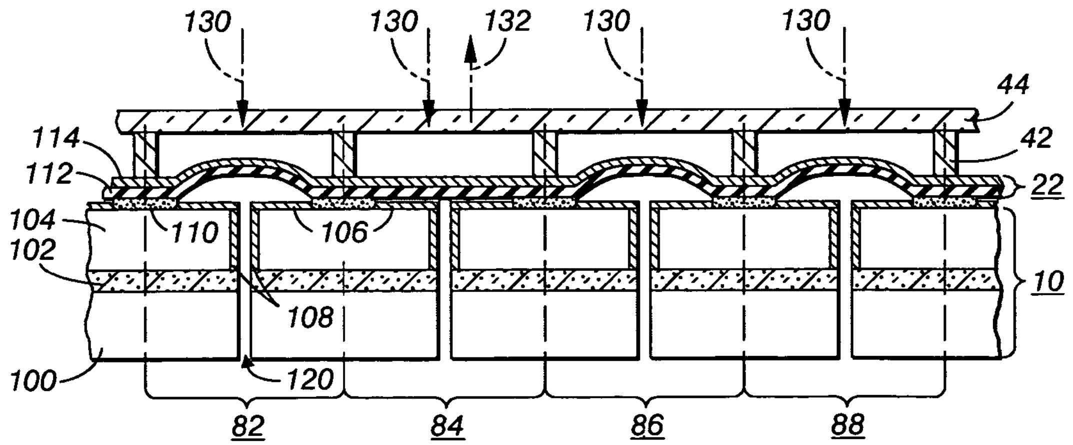
FIG. 4

FIG. 5
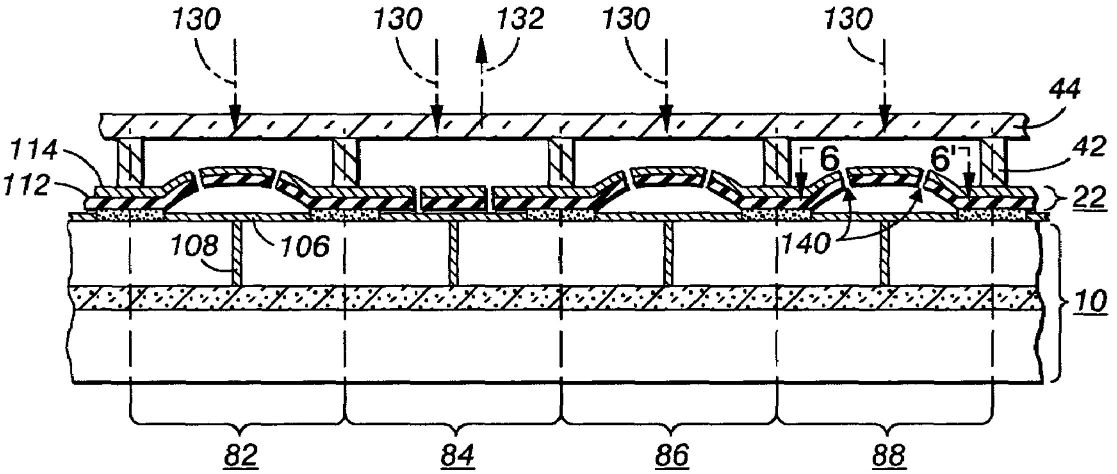
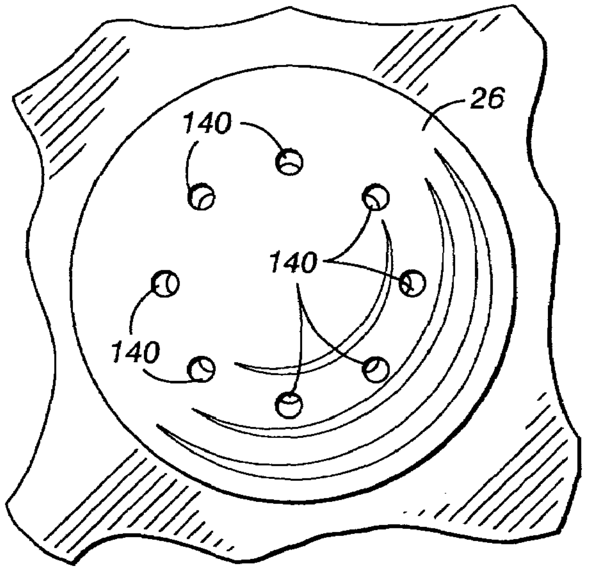
FIG. 6

FIG. 7
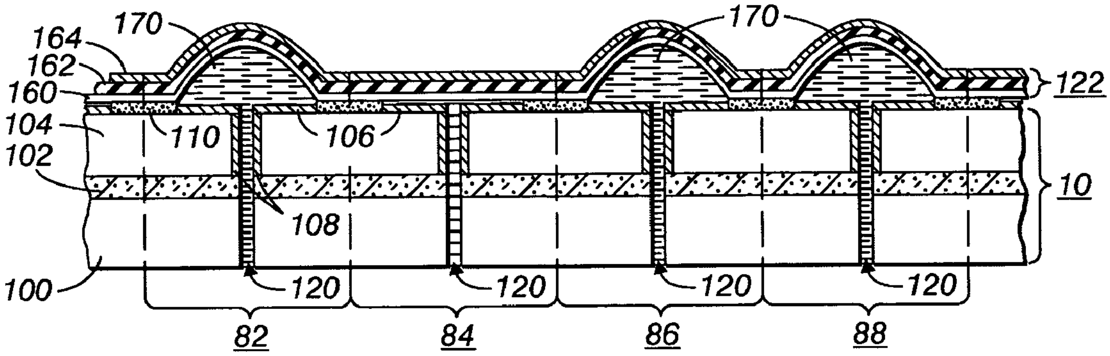
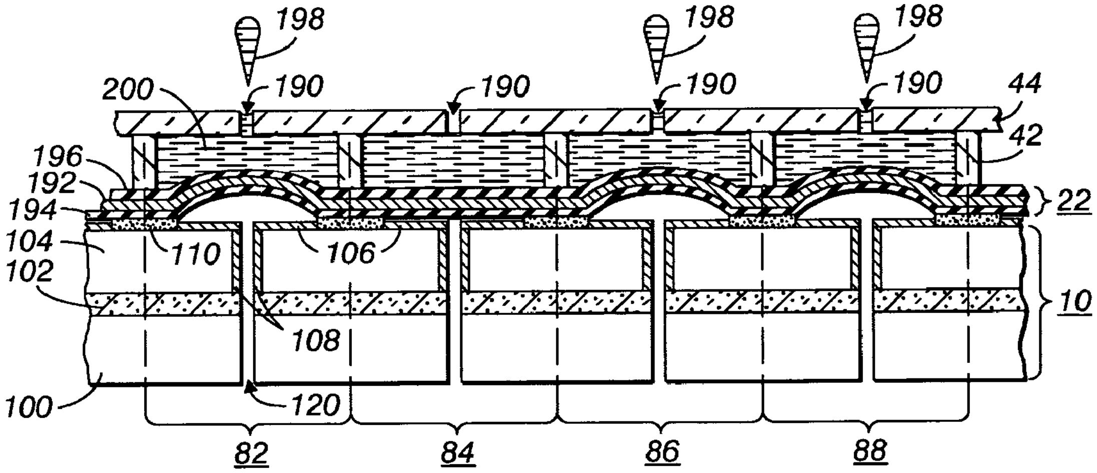
FIG. 8

*FIG. 9*
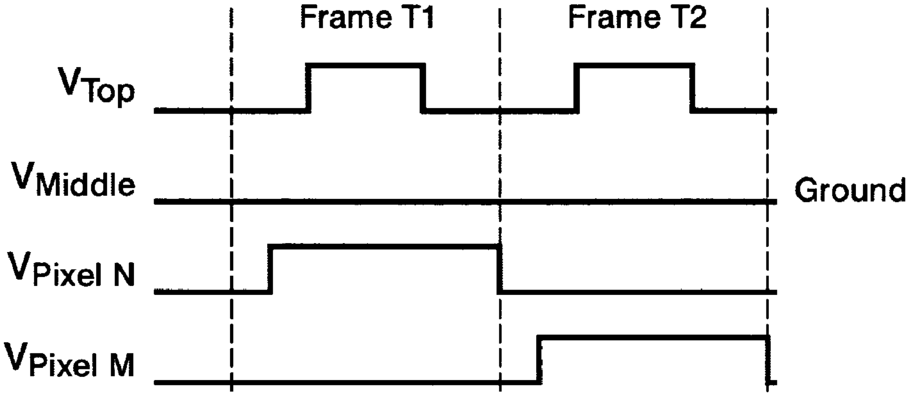
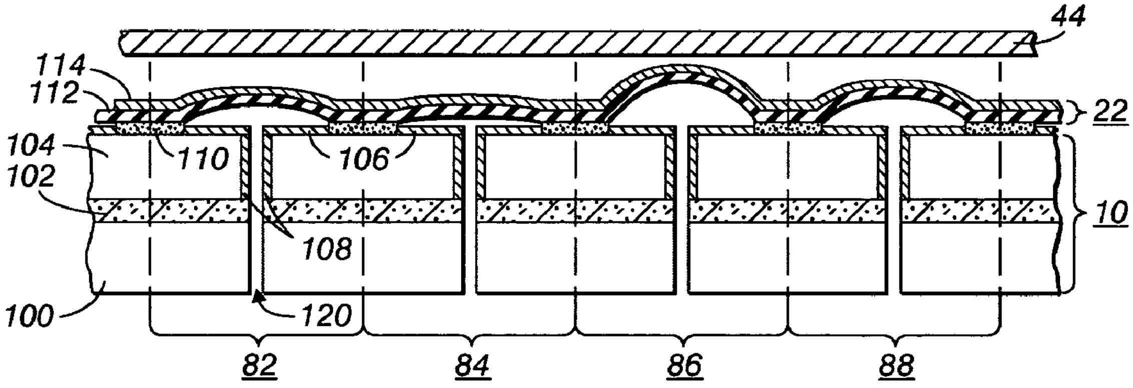
*FIG. 10*

VARIABLE VOLUME BETWEEN FLEXIBLE STRUCTURE AND SUPPORT SURFACE

BACKGROUND OF THE INVENTION

The present invention relates generally to techniques in which a flexible structure is attached to a support surface. More particularly, the invention relates to techniques in which a variable volume is defined between a flexible structure and a support surface.

Techniques have been previously proposed in which a flexible material such as polymer is deposited on a substrate. For example, Doany, F. E., and Narayan, C., "Laser release process to obtain freestanding multilayer metal-polyimide circuits," IBM J. Res. Develop., Volume 41, No. 1-2, January/March 1997, pp. 151-157, describe deposition of polymer films with metal wiring features, after which the structure is removed from the substrate by a laser separation process that ablates a polymeric layer, forming a freestanding structure. Bakir, M. S., Reed, H. A., Mulé, A. V., Jayachandran, J. P., Kohl, P. A., Martin, K. P., Gaylord, T. K., and Meindl, J. D., "Chip-to-Module Interconnections Using 'Sea of Leads' Technology," MRS Bulletin, January 2003, pp. 61-63 and 66-67, describe application and patterning of a sacrificial polymer on a wafer, followed by deposition of an overcoat polymer; the sacrificial polymer is then thermally decomposed to form an air gap embedded within the overcoat polymer, after which vias are fabricated to expose die pads and allow electrical connection of leads on the overcoat polymer to a chip in the wafer.

Previous techniques, however, are limited in the variety of articles that can be produced with a flexible structure attached to a support surface. It would be advantageous to have additional techniques for flexible structures attached to support surfaces.

SUMMARY OF THE INVENTION

The invention provides various exemplary embodiments of cells, arrays, apparatus, and methods. In general, each embodiment involves a variable volume between a flexible structure and a support surface to which it is attached.

These and other features and advantages of exemplary embodiments of the invention are described below with reference to the accompanying drawings.

BRIEF DESCRIPTION OF THE DRAWINGS

FIG. 1 is a top view of a cell with variable volume showing circuitry schematically.

FIG. 2 is a schematic cross-sectional view of the cell of FIG. 1 taken along the line 2-2', with additional structure above the variable volume.

FIG. 3 is a schematic top view of an array of cells with variable volume

FIG. 4 is a cross-sectional view of an array as in FIG. 3, along the line A-A', implemented as an optical modulator.

FIG. 5 is a cross-sectional view of an array as in FIG. 3, along the line A-A', implemented as another optical modulator.

FIG. 6 is a top view of the unattached region of the flexible structure for a cell in the implementation of FIG. 5, taken along the line 6-6' in FIG. 5.

FIG. 7 is a cross-sectional view of an array as in FIG. 3, along the line A-A', implemented as a display.

FIG. 8 is a cross-sectional view of an array as in FIG. 3, along the line A-A', implemented as a printer.

FIG. 9 is a timing diagram of signals to cell regions of an array as in FIG. 8.

FIG. 10 is a cross-sectional view of an array as in FIG. 3, along the line A-A', implemented as a microphone.

DETAILED DESCRIPTION

Figure 11:
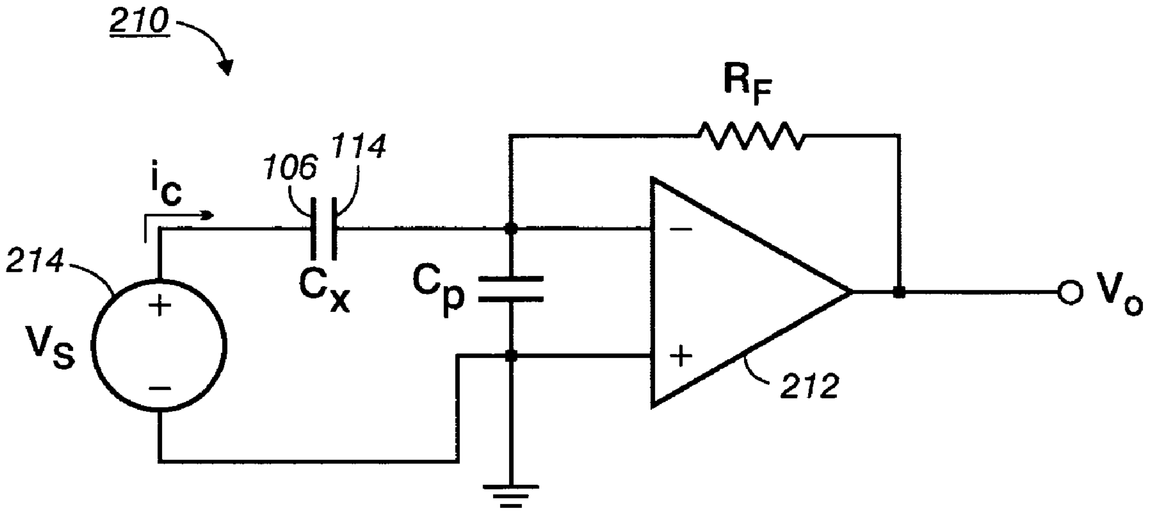
FIG. 11 is a schematic diagram of a circuit that could be used with the array of FIG. 10.

In the following detailed description, numeric ranges are provided for various aspects of the implementations described. These recited ranges are to be treated as examples only, and are not intended to limit the scope of the claims hereof. In addition, a number of materials are identified as suitable for various facets of the implementations. These recited materials are to be treated as exemplary, and are not intended to limit the scope of the claims hereof.

Various techniques have been developed for producing structures with one or more dimensions smaller than 1 mm. In particular, some techniques for producing such structures are referred to as "microfabrication." Examples of microfabrication include various techniques for depositing materials such as growth of epitaxial material, sputter deposition, evaporation techniques, plating techniques, spin coating, and other such techniques; techniques for patterning materials, such as photolithography; techniques for polishing, planarizing, or otherwise modifying exposed surfaces of materials; and so forth.

In general, structures, elements, and components described herein are supported on a "support structure" or "support surface", which terms are used herein to mean a structure or a structure's surface that can support other structures; more specifically, a support structure could be a "substrate", used herein to mean a support structure on a surface of which other structures can be formed or attached by microfabrication or similar processes.

The surface of a substrate or other support structure is treated herein as providing a directional orientation as follows: A direction away from the surface is "up" or "over", while a direction toward the surface is "down" or "under". The terms "upper" and "top" are typically applied to structures, components, or surfaces disposed away from the surface, while "lower" or "underlying" are applied to structures, components, or surfaces disposed toward the surface. In general, it should be understood that the above directional orientation is arbitrary and only for ease of description, and that a support structure or substrate may have any appropriate orientation.

A process that produces a layer or other accumulation of material on structures or components over a substrate's surface can be said to "deposit" the material, in contrast to processes that attach a part such as by forming a wire bond or that mechanically transfer an existing layer from one substrate to another. A structure is "fabricated on" a surface when the structure was produced on or over the surface by microfabrication or similar processes.

A structure or component is "attached" to another when the two have surfaces that are substantially in contact with each other and the contacting surfaces are held together by more than mere mechanical contact, such as by an adhesive, a thermal bond, or a fastener, for example. A structure or component is "directly on" a surface when it is both over and in contact with the surface.

As used herein, "flexible structure" refers to a structure that can be deformed without breaking; specifically, as used herein, a flexible structure can be stretched from an unstretched position to other positions by a force, referred to herein as a "stretching force". A flexible structure is referred to herein as "unstretched" when it is subject to approximately zero stretching force.

An "elastically flexible structure" is a flexible structure that returns elastically to substantially its unstretched position when released after being stretched; this elastic behavior is a materials property, and is true, for example, of many polymer materials. As used herein, "polymer" refers to any material that includes one or more compounds formed by polymerization and that has properties resulting from presence of those compounds. An elastically flexible structure may also have plastic deformation, especially if subject to extraordinary stretching force, but across some useful range of stretching forces its deformation is substantially elastic.

The invention provides certain implementations that are characterized as "cells" and "arrays", terms that have related meanings herein: An "array" is an arrangement of "cells". An array may also include circuitry that connects to electrical components within the cells such as to select cells or transfer signals to or from cells, and such circuitry is sometimes referred to herein as "array circuitry". In contrast, the term "peripheral circuitry" is used herein to refer to circuitry on the same support surface as an array and connected to its array circuitry but outside the array. The term "external circuitry" is more general, including not only peripheral circuitry but also any other circuitry that is outside a given cell or array.

FIG. 1 shows support structure 10 with surface 12 on which is supported cell 20. Cell 20 includes an elastically flexible structure 22 that is attached to surface 12 in region 24 and unattached to surface 12 in region 26. FIG. 1 also shows region 26 surrounded by region 24 in the sense that region 24 bounds region 26 all along its outer margin. When unstretched, flexible structure 22 lies in a "flat position", meaning a position in which there is substantially no space, and therefore no gaseous or liquid fluid, between it and the underlying surface; more specifically, the lower side of flexible structure 22 is directly on surface 12 or other surfaces within region 26 that form the support surface.

As described below in relation to FIG. 2, cell 20 also includes "electrodes", a term used herein to refer to a component within which charge carriers such as electrons or holes have nonzero mobility; electrodes can function, for example, as components through which current flows or as components within which charge can be concentrated in regions, such as within a capacitor electrode. Circuitry 28 provides conductive paths between at least some of the electrodes and external circuitry 30. More specifically, circuitry 28 provides at least one "signal path", meaning a conductive path through which information is transferred from one component to another, such as from an electrode to external circuitry 30 or vice versa.

FIG. 2 shows a cross-section of cell 20 taken along the line 2-2' in FIG. 1, with flexible structure 22 in one of its possible stretched positions in response to a stretching force (not shown). As shown, cell 20 further includes variable volume 40 between flexible structure 22 and surface 12; as used herein, the term "variable volume" refers generally to a substantially enclosed volume that can change in response to one or more forces. As illustrated by the double arrow in FIG. 2, variable volume 40 increases and decreases in volume as flexible structure 22 rises and falls, respectively. More generally, variable volume 40 varies as flexible structure 22 moves in region 26.

FIGS. 1 and 2 suggest a useful approach to measuring cells. An important feature of cell 20 is the area of region 26, which is also the area of variable volume 40. As used herein, the term "micro-cell" refers to a cell with a variable volume whose area on a support surface is not greater than approximately 1 $mm^2$.

In FIG. 2, spacers 42 support top structure 44, which extends over volume 46 above flexible structure 22. Although volume 46 would also vary as flexible structure 22 moves in region 26, it may not be substantially enclosed as a variable volume would be, as described below in relation to some implementations.

Flexible structure 22 is illustratively a layered structure with one or more layers of material that may have been differently patterned. The main part of flexible structure 22 is an elastically flexible material, such as a polymer film or other thin layered structure of polymer material. Polyimide, for example, can be deposited by a spin coating process to produce an elastically flexible polymer film on a support surface. Movable electrode 50 is illustratively shown as a separate, differently patterned layer on the elastically flexible material. Movable electrode 50 is part of flexible structure 22 and therefore moves with it.

Cell 20 also includes a set of stationary electrodes, including electrodes 52 and 54. Electrode 52 is illustratively on surface 12 with its upper surface being part of the support surface on which flexible structure 22 lies when in the flat position, but electrode 52 could instead be a conductive region under surface 12. Electrode 54 is illustratively part of top structure 44. Movable electrode 50 is illustratively shown on the upper side of flexible structure 22, but could be implemented within or on the lower side of flexible structure 22 if appropriate modifications are made to avoid electrical contact between electrodes 50 and 52.

Since region 24 surrounds region 26, variable volume 40 is enclosed with the possible exception of one or more ducts for fluid communication with variable volume 40, schematically represented in FIG. 2 by duct emblem 60. The term "duct" is used herein to refer to a channel for fluid flow from region to region. In actual implementations, a duct could permit fluid flow between variable volume 40 and an exterior region; for example, one or more ducts could be defined in support structure 10 or in flexible structure 22, as described below in relation to implementations. Furthermore, fluid under pressure can through a duct and produce a stretching force away from surface 12 on flexible structure 22; in response, flexible structure 22 moves out of its flat position to provide variable volume 40.

Stationary electrodes 52 and 54 are insulated from movable electrode 50. As a result, charge levels on electrodes 50, 52, and 54 produce electrical fields that interact mechanically with flexible structure 22 through electrode 50. In addition, flexible structure 22 has pressure interactions at its lower surface with fluid in variable volume 40 and at its upper surface with fluid in volume 46. As used herein, charge levels on electrodes are described as "coupling with" a variable volume if signals changing one or more of the charge levels tend to provide or change the variable volume or if variations in the variable volume, such as in response to pressure interactions, tend to provide signals through one or more of the electrodes. Similarly, charge levels on electrodes are described as "coupling with each other" if the charge levels result in attractions or other interactions between the electrodes; for example, attraction between electrodes 50 and 54 would provide a stretching force away from surface 12 on flexible structure 22, and flexible structure 22 would respond by moving out of its flat position to provide variable volume 40. Various examples of coupling between charge levels are described below in relation to implementations.

A structure with features as shown in FIGS. 1 and 2 could be produced in various ways using various materials. In general, the choice of particular materials and manufacturing techniques depends on the application, but the following indicate the range of available materials and techniques.

Support structure 10 could be a glass substrate on which lower electrode 52 has been photolithographically patterned from a layer of conductive material; the conductive material could include sputter coated chromium to a depth of 10 nm and gold to a depth of 100 nm. Instead of glass, support structure 10 could be a silicon wafer coated with insulating silicon dioxide or a flexible substrate material such as Mylar® from DuPont. If transparent electrodes are desired, the conductive material could be sputtered indium-tin-oxide (ITO).

Flexible structure 22 could be a membrane with a suitable polymer layer. For example, it could be made from spin-coated polyimide such as one of the polyimides available from HD MicroSystems, e.g. HD-4000, PI-2600, or another. Such a material has a modulus of elasticity (Young's modulus) in the range of 3-8 GPa and the membrane could have a thickness of 1 μm. A more elastic membrane material could be chosen, such as silicone, e.g. Sylgard® 184 from Dow Corning Corporation, with a modulus of elasticity around 2 MPa. Due to the much lower modulus of electicity for silicones, the membrane may be thicker, e.g. 10 μm. The diameter of the unattached area of the membrane may be 400 μm, but depending on the application could be as small as 50 μm, or as large as 10 mm.

The middle electrode 50 on flexible structure 22 could include sputter coated chromium/gold; a transparent conductor such as ITO; or a more flexible conductor such as one of the carbon nanotube-based polymers developed by Eikos, Inc., Franklin, Mass. Electrode 50 could be patterned into stripes, a spiral shape, or another similar shape for stress relief during bowing or flexing of flexible structure 22.

Spacers 42 could be photolithographically patterned onto flexible structure 22 from a layer of a photopolymer such as SU-8 from MicroChem, Corp. Spacer walls could be formed by other techniques such as by printing of polymers, laser ablation, or plating techniques. The height of spacers 42 may be between 5 μm and 100 μm, or even as high as several hundred microns if appropriate.

Top structure 44 could be a counter plate bonded to spacers 42 in any appropriate way. Structure 44 could, for example, be a glass plate with a patterned top electrode 54 made of ITO for transparency. Also, rather than being formed on flexible structure 22, spacers 42 could be patterned on structure 44, in which case the assembly including structure 44 and spacers 42 could be bonded onto flexible structure 22.

FIG. 3 illustrates array 80 on surface 12 of support structure 10. Array 80 includes cells 82, 84, 86, and 88, each of which could be implemented as shown in FIGS. 1 and 2. As suggested by the ellipses, array 80 could be a two-dimensional array, the cells of which could be individually addressed by appropriate circuitry, such as circuitry that addresses each cell by row and column. Peripheral circuitry 90 on surface 12, but outside array 80, can have signal communication with each electrode through array circuitry 92, connected to each electrode.

FIG. 4 shows a cross-section of an optical modulator implementation of array 80, taken along the line A-A' in FIG. 3. In FIG. 4, ducts in support structure 10 serve as breathing holes. Support structure 10 illustratively includes three general layers—substrate 100, device layer 102, and insulating layer 104. Device layer 102 can include control and signal lines for cells in array 80, and can also include active switches to control charge transfer to or from lower electrode 106 through interconnecting material 108, illustratively labeled for cell 82 but similarly structured for other cells. Interconnecting material 108 could, for example, be sputter coated metal, plated metal, or plasma deposited doped amorphous silicon, deposited in each case within a via or other opening defined in insulating layer 104 or a region of conductive material produced by modifying insulating layer 104 in some other way.

Flexible structure 22 is attached to support structure 10 by adhesive material 110 in the attached region 24 (FIG. 1) of each cell. Adhesive material 110 is an example of an "adhesion structure", used herein to refer to a layer, layered structure, part of a layer or layered structure, or another structure that adheres to surfaces of each of two or more other components, attaching the surfaces to each other; an adhesion structure could be or include a thin layer of material from the surface of one of the components, melted or otherwise modified so that it adheres to the surface of the other component. In this case, adhesive material 110 adheres to both the lower surface of flexible structure 22 and the upper surface of support structure 10, attaching them to each other.

Lower electrode 106 is in unattached region 26 (FIG. 1), directly under flexible structure 22 and part of the support surface that is in contact with flexible structure 22 in its flat position. Each cell's lower electrode is independently addressable.

Flexible structure 22 can, for example, include polyimide film 112 on top of which is middle electrode 114, a movable electrode that illustratively extends throughout array 80 and is therefore common to all cells. As in FIG. 2, top structure 44 is separated from flexible structure 22 by spacers 42. Top structure 44 includes an upper stationary electrode (not shown), which can, for example, be independently addressable for each cell or common to all cells.

In operation, charge carriers concentrated in lower electrode 106, middle electrode 114, and the upper electrode (not shown) interact through electric fields, causing flexible structure 22 to move between its flat position, illustrated for cell 84, and an open position, illustrated for cells 82, 86, and 88. These interactions provide examples of charge levels on electrodes coupling with each other and with a variable volume. For example, all cells can be reset to their flat positions by grounding all lower electrodes while applying the same voltage potential to the upper and middle electrodes. Then the upper electrode can be grounded and charges can be applied to selected lower electrodes to change their cells to their open positions. When flexible structure 22 moves from its flat position to the open position, fluid such as air is drawn into the cell's variable volume through duct 120 defined in support structure 10, as illustratively labeled for cell 82. Similarly, when flexible structure 22 moves from a cell's open position to its flat position, fluid is expelled from the cell's variable volume through duct 120.

In general, the volume between flexible structure 22 and top structure 44 forms a plenum that communicates with the exterior of array 80. Spacers 42 do not continuously surround the cells, so that fluid such as air is relatively free to flow in and out of the plenum region above each cell.

Top structure 44 is substantially transparent, while middle electrode 114 is reflective. For an appropriate wavelength, the change in position of middle electrode 114 between flat and open positions of flexible structure 22 is sufficient to change between constructive and destructive interaction between incident and reflected light. Arrows 130 indicate substantially monochromatic incident light arriving at each of cells 82, 84, 86, and 88. Due to destructive interaction, however, light is not effectively reflected by cells 82, 86, and 88, but arrow 132 indicates that a constructive interaction permits effective reflection of light from cell 84. More specifically, if the difference between the flat and open positions of flexible structure 22 is one-fourth the wavelength of incident light, a transition between constructive and destructive interaction can be obtained. For example, for wavelengths between 1300-1500 nm, used in optical fiber communication, one-quarter wavelength would be approximately 300 nm.

The approach of Francais, O., and Dufour, I., "Enhancement of elementary displaced volume with electrostatically actuated diaphragms: application to electrostatic micropumps," *J. Micromech. Microeng.*, Vol. 10, 2000, pp. 282-286, incorporated herein by reference, can be used to obtain the voltage requirement to deflect a membrane such as flexible structure 22 a given distance. If it is assumed that the internal stress of polyimide film 112 is 2 MPa, a cell's unattached membrane surface area is 0.16 $mm^2$, the thickness of the membrane is 3 μm, and the air gap between the membrane and lower electrode 106 in the open position is 3 μm, approximately 20 V are required to deflect the membrane by 300 nm. This voltage level can be applied using currently available active matrix addressing techniques through appropriate circuitry in device layer 102.

At small cell sizes, problems may arise with curvature-induced divergence. Therefore, the size of the cell should be much larger than the optical beam size. For a 10 μm diameter laser beam and 400 μm cell diameter, the deviation of the height from the beam edge to the center is only about 0.06%.

To fabricate the structure of FIG. 4, device layer 102 can first be fabricated on the surface of substrate 100, using any suitable techniques such as conventional deposition and photolithographic patterning techniques. Insulating layer 104 can then be deposited over device layer 102; layer 104 could, for example, include a photopolymer such as SU-8 from MicroChem, Corp., deposited to a thickness between approximately 1 μm and several 10 s of microns and patterned to include openings or through-holes for subsequent formation of ducts 120. Interconnecting material 108 and lower electrode 106 can then be formed, such as by sputtering and plating techniques. More specifically, a plasma deposition method such as plasma deposited (PECVD) doped amorphous silicon may give a high quality conformal coating of narrow through-holes in layer 104. To prevent the subsequent membrane coating from filling the through-holes, the through-holes may be temporarily filled with a wax or another polymer such as PVA that can be dissolved at a later stage.

Flexible structure 22 can then be produced and selectively adhered to the exposed surface such as by any of the selective adhesion techniques described in greater detail below. Middle electrode 114 can be produced on top of polyimide film 112 by deposition and photolithographic patterning of conductive material.

Spacers 42 can be fabricated by depositing an insulating material to a height of approximately 3 μm and then performing photolithographic patterning. Top structure 44, produced separately with similar techniques, can then be attached to the top surfaces of spacers 42, such as with an adhesive material or an appropriate bonding process.

Ducts 120 can be etched from the lower surface of substrate 100 through device layer 102, through interconnecting material 108 in insulating layer 104, and through lower electrode 106, stopping at polyimide layer 112. For example, if substrate 100 is silicon, deep reactive ion etching could be used; if substrate 100 is polymer material, laser ablation could be used; and other etching methods could be used as appropriate.

FIG. 5 shows a variation of the optical modulator in FIG. 4 in which duct 120 is not defined in support structure 10, but instead ducts 140 are defined in flexible structure 22. The operation of the optical modulator in FIG. 5 is substantially as described above in relation to FIG. 4. In fabrication, ducts 140 can be constructed after flexible structure 22 is fabricated, such as by photolithographically patterning a resist layer and by then etching through openings in the resist layer. In other respects, fabrication can be the same as described above. FIG. 6 shows an example of a pattern of ducts 140 in unattached region 26 of flexible structure 22 in cell 88, viewed along the line 6-6' in FIG. 5.

FIGS. 4-6 illustrate examples of optical modulators in which a flexible structure is attached to a surface of a support structure in an array. In each of two or more cell regions within the array, however, the flexible structure is unattached to the support surface. In each cell region, the flexible structure and the support surface define a respective variable volume between them. In each cell region, the flexible structure includes a movable electrode portion and the cell region also includes a set of at least one stationary electrodes. As a result, charge levels on each cell region's movable electrode portion and stationary electrodes couple with each other and with the cell region's variable volume.

The optical modulator also includes array circuitry that connects to at least one electrode and peripheral circuitry at the support surface outside the array region as illustrated in FIG. 3. The peripheral circuitry thus has signal communication with at least one electrode through the array circuitry. An optical modulator as in FIGS. 4-6 also includes a transparent top structure over the flexible structure, and the flexible structure has a reflective upper surface area for each cell region. The peripheral circuitry provides signals to each cell region's lower electrode through the array circuitry, and the signals produce charge levels causing the flexible structure to move between a flat position and an open position in which a variable volume is provided. As a result, the cell region's reflective upper surface area reflects differently in the flat and open positions, modulating incident light.

FIG. 7 shows a cross-section of a display implementation of array 80, taken along the line A-A' in FIG. 3. As in FIG. 4, ducts in support structure 10 allow fluid to flow in and out of each cell region's variable volume, but the fluid in this implementation is a dye or other light absorbent fluid that can interact with light when flexible structure 22 is in the open position. For a black and white or other monochrome display, the dye can be black or another monochrome color; for a multicolor display, separate dye reservoirs (such as red, green, blue, and black dyes) can be connected with the ducts of different sets of cells, and the cells of the colors can be arranged in an appropriate pattern. Support structure 10 can be implemented as described above in relation to FIG. 4.

There are several differences between the implementation in FIG. 7 and that of FIG. 4. Flexible structure 22 in this implementation includes three general layers—a thin polyimide layer 160; an elastic polymer layer 162 such as a silicon rubber-like material; and an upper electrode layer 164. The flexibility of structure 22 allows much larger volume change for each cell region than in the implementation of FIGS. 4 and 5. Also, lower electrode 106 is highly reflective material, such as an appropriately chosen metal. The implementation of FIG. 7 illustratively does not include a top structure as in FIGS. 4 and 5, although a top structure could be provided.

In operation, fluid 170 is kept under a slight positive pressure by a fluid pressure system (not shown) and is available from a fluid reservoir (not shown) through ducts 120. When charge carriers of the same polarity are concentrated in upper electrode layer 164 and lower electrode 106, flexible structure 22 is held in its flat position with fluid 170 expelled through duct 120, as illustrated for cell 84. In this position, incident light is reflected from lower electrode 106. When lower electrode 106 is then connected to ground, fluid 170 can enter through duct 120, providing the variable volume of a cell region, as illustrated for cells 82, 86, and 88. In this open position, fluid 170 absorbs incident light, so that the cell region appears dark.

To fabricate the structure of FIG. 7, the same techniques can be used as described above in relation to FIG. 4, except that a different combination of layers can be deposited to form flexible structure 22, as described above. The materials chosen can be nearly transparent, to maximize the contrast between light and dark cell regions of the display.

FIG. 7 therefore illustrates an example of a display in which a flexible structure is attached to a surface of a support structure in an array with cell regions and electrodes as summarized above for FIGS. 4-6. In the display, each cell region's stationary electrodes include a reflective lower electrode on the support surface, and each cell region's variable volume has fluid communication through a duct with a fluid reservoir that contains a light absorbent fluid. As a result, the cell region's reflective lower electrode reflects incident light in the flat position, while the light absorbent fluid prevents reflection in the open position in which it provides the variable volume.

FIG. 8 shows a cross-section of a printhead implementation of array 80, taken along the line A-A' in FIG. 3. As in FIG. 4, ducts in support structure 10 allow fluid communication with each cell region's variable volume, but an important difference is that the volume between top structure 44 and flexible structure 22 holds another fluid, droplets of which are ejected through apertures in top structure 44. Support structure 10 can be implemented as described above in relation to FIG. 4.

One difference between the implementation in FIG. 8 and that of FIG. 4 is the presence of apertures 190 defined in top structure 44. As noted above, top structure 44 can be produced separately with techniques such as deposition and photolithographic patterning, and can include an upper electrode (not shown) in each cell region. After deposition and patterning of layers in top structure 44, a layer of photoresist can be patterned to include an opening corresponding to the position of each cell region. An etching operation through these openings can then produce apertures 190 as shown in FIG. 8.

Another difference between the implementation in FIG. 8 and that of FIG. 4 is in the layers of flexible structure 22. To protect middle electrode 192 from contact with other electrodes and fluids, flexible structure 22 includes lower polyimide film 194 below middle electrode 192 and upper polyimide film 196 over middle electrode 192. In the resulting structure, spacing between middle electrode 192 and the top electrode (not shown) is a few microns. If the effective area of a cell region's variable volume is 70 μm×70 μm, a volume change of (70 μm×70 μm×1 μm) provides a droplet 198 containing approximately 5 pl of fluid 200. For an ink-jet printer, for example, fluid 200 can be an appropriate ink or other marking fluid.

In operation, fluid 200 is provided to the plenum region between top structure 44 and flexible structure 22 under a slight positive pressure so that the entire plenum fills. Then voltage signals under the control of peripheral circuitry 90 (FIG. 3) are provided through array circuitry 92 (FIG. 3).

FIG. 9 illustrates an example of voltage signals that could be provided to perform a printing operation with the apparatus of FIG. 8. FIG. 9 illustratively shows frames T1 and T2. As shown, middle electrode 192 is connected to a constant voltage (illustratively referred to as a "ground") during the sequence of signals shown in FIG. 9; as will be understood, however, the middle electrode must be more attracted by a low voltage on lower electrode 106 than by a low voltage on the upper electrode (not shown). The upper electrode (not shown) in top structure 44 is pulsed by the voltage signal $V_{top}$, with one pulse being provided during each frame. Lower electrode 106 in each cell region is independently addressable, and therefore receives a specific signal $V_{pixel}$, with the signals to the lower electrodes 106 of pixels M and N being shown in FIG. 9. The signals to lower electrodes 106 are provided through device layer 102 and interconnecting material 108 in support structure 10.

Each frame begins with an interval during which $V_{top}$ and $V_{pixel}$ are both low for all cell regions, so that flexible structure 22 remains in its flat position. Then, at the end of the initial interval, the $V_{pixel}$ signal goes high for each cell region that is ejecting a droplet of fluid during the current frame; as a result, middle electrode 192 is attracted by the upper electrode into an open position, as illustrated for cells 82, 86, and 88 in FIG. 8. For pixels that are not ejecting during the current frame, $V_{pixel}$ remains low through the frame, and flexible structure 22 remains in its flat position, as illustrated for cell 84 in FIG. 8. Then, $V_{top}$ is pulsed high to more strongly attract middle electrode 192, causing a brief deflection of flexible structure 22 toward top structure 44 and producing an ejected droplet 198 through aperture 190 from each ejecting cell region.

In FIG. 9, pixel M does not eject during frame T1 but ejects during frame T2, while pixel N ejects during frame T1 but does not eject during frame T2. In other words, during frame T1, the voltage of lower electrode 106 in pixel M holds flexible structure 22 flat, so that the voltage pulse on the upper electrode (not shown) does not produce an ejected droplet 198. The high voltage on lower electrode 106 of pixel N releases flexible structure 22 into the open position, however, so that a droplet is ejected from pixel N in response to the pulse to the upper electrode (not shown). Each pulse of the upper electrode (not shown) therefore produces a printing operation from all ejecting cell regions, and other appropriate operations can be performed between frames, such as to move the paper sheet or other substrate onto which droplets 198 are ejected.

The structure of FIG. 8 can be fabricated with the same techniques described above in relation to FIG. 4, except for a few changes. A different combination of layers can be deposited to form flexible structure 22, as described above. Also, apertures can be defined in top structure 44, also as described above. Appropriate additional structures (not shown) can supply fluid 200 under slight positive pressure to the plenum between top structure 44 and flexible structure 22.

FIG. 8 therefore illustrates an example of a printhead in which a flexible structure is attached to a surface of a support structure in an array with cell regions and electrodes as summarized above for FIGS. 4-6. In the printhead, each cell region's electrodes include first and second electrodes that receive signals from peripheral circuitry. The first electrode, when signaled, changes the cell region between its flat position and an open position in which a variable volume is provided. The second electrode, when signaled while the cell region is in the open position, causes droplet ejection. The printhead also has a top structure over the flexible structure with an aperture defined therein for each cell region, and droplets of fluid from a plenum region between the top structure and the flexible structure are ejected through the apertures in response to signals from the peripheral circuitry.

FIG. 10 shows a cross-section of a microphone implementation of array 80, taken along the line A-A' in FIG. 3. As in FIG. 4, ducts in support structure 10 allow fluid communication with each cell region's variable volume, but an important difference is that the flow of fluid is part of a resonance phenomenon in each cell region's variable volume. More specifically, the ducts permit each cell's portion of flexible structure 22 to vibrate freely in response to incident pressure waves arriving at the lower surface of support structure 10. Another difference is that signals from lower electrode 106 are received by peripheral circuitry 92 in order to obtain information about vibration frequencies and intensities. Support structure 10, lower electrodes 106, and flexible structure 22 can be implemented as described above in relation to FIG. 4.

Top structure 44 in FIG. 10 is not supported on spacers as in FIG. 4, but rather is supported at the edge of array 80. As suggested by the hatching in FIG. 10, top structure 44 can be a single top electrode that is conductive, such as an appropriate metal structure. Top structure 44 and middle electrode 114 can be biased and each cell's variable volume can have a diameter or other dimension sized so that flexible structure 22 resonates in response to incoming pressure waves in a specific wavelength range. The resulting vibration at the cell region's resonance frequency can then be detected.

Device layer 102 can include readout circuitry that allows peripheral circuitry 92 to read the capacitance change for each cell region. Peripheral circuitry 92 can then use the readout signals to obtain an acoustic spectrum for the incoming pressure waves.

To fabricate the structure of FIG. 10, the same techniques can be used as described above in relation to FIG. 4, except that top structure 44 can be attached to or mounted on substrate 10 at the periphery of array 80 rather than on spacers. In addition, the specific circuitry in device layer 102 will be suitable for readout of capacitive changes, as described above.

FIG. 10 therefore illustrates an example of a microphone in which a flexible structure is attached to a surface of a support structure in an array with cell regions and electrodes as summarized above for FIGS. 4-6. In the microphone, each region's set of electrodes includes a lower electrode on the support surface from which the peripheral circuitry receives readout signals. In addition, the microphone includes a top electrode, and each cell region has a resonance frequency at which it converts received sound waves into readout signals.

FIG. 11 shows circuit 210, a simple circuit that could be used to measure deflection of flexible structure 22 in FIG. 10, similar to circuitry described by Senturia, S. C., *Microsystem Design*, Boston, Kluwer, 2001, pp. 502-507, incorporated herein by reference. Circuit 210 illustratively senses capacitance between lower electrode 106 and middle electrode 114 for one cell, but could be readily modified to measure capacitance for cells in sequence.

Amplifier 212 provides output signal $V_O=-R_F i_C$ in response to the current $i_c$ through displacement sensing capacitance $C_x$, i.e. the capacitor formed by electrodes 106 and 114. The current is caused by deflection or stretching of flexible structure 22 which in turn changes capacitance. Voltage source 214 acts as a driver. Parasitic capacitance $C_P$ arises from the interconnect between electrode 114 and amplifier 212.

The implementations described above in relation to FIGS. 4-11 are merely exemplary, and cells and arrays as described above in relation to FIGS. 1-3 could be implemented in a wide variety of other ways for a wide variety of other applications. Furthermore, cells and arrays as described above could be produced in many different ways. In general, conventional fabrication techniques and their foreseeable future variations can all be used to implement support structures, flexible structures, top structures, and other components.

FIGS. 12-15 illustrate several ways in which flexible structure 22 can be attached to surface 12 of support structure 10 to implement features described above. In general, the techniques of FIGS. 12-15 include selective adhesion of a polyimide film to another material at surface 12 (FIGS. 1-3).

The techniques in FIGS. 12-15 could also be implemented to produce other structures, such as free-standing polyimide films with microelectronic devices on or in the polyimide. These techniques can overcome problems encountered when using a Kapton® film from DuPont bonded to a glass substrate using BCB solution as an adhesive. Although BCB material is stable up to approximately 220 degrees C., the seal between the film and the substrate is poor, resulting in impurity trapping there. Also, it is difficult to hold the film flat with BCB glue. As a result, the critical dimension of amorphous silicon p-i-n devices on such a film has been larger than 10 μm.

These problems have been overcome in a selective adhesion implementation in which a wafer's rim region is made adhesive to polyimide film; a polyimide solution is twice spin-coated to a thickness of approximately 15 μm; the polyimide is post annealed to obtain a film ready for standard wafer processing; chromium metal is deposited on the film and patterned by etching through a suitable photoresist patterned with a suitable mask; the center, non-adhesive portion of the film is released from the wafer; and a plastic disk is attached to the released polyimide film to avoid severe curving due to stress gradient in the film. Adhesion in the rim region seals the film very well and keeps the film flat during processing, allowing production of features as small as 2-3 μm.

Figure 12:
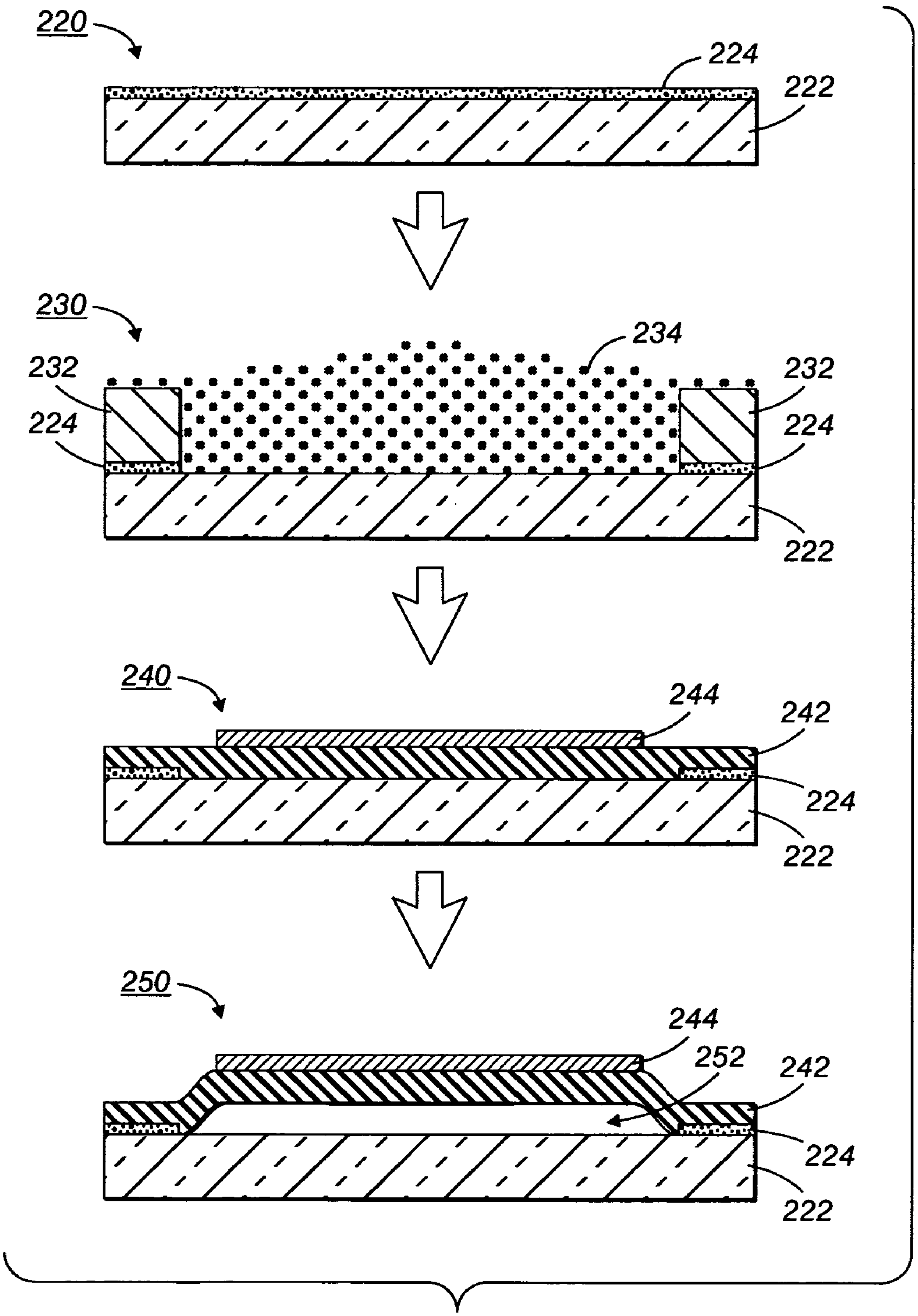
FIG. 12 shows cross-sectional views of stages in a process that produces a variable volume cell.

FIG. 12 illustrates an approach to selective adhesion by modifying an adhesion promoter that promotes adhesion of polyimide to a support surface; more generally, the term "adhesion promoter" refers to any material that promotes adhesion of two surfaces. The polyimide can, for example, be P2610 Series from HD MicroSystems™. This polyimide film has a low stress, such as 2 MPa tensile stress for 10 μm thick, cured 2611 film. It also has a high decomposition temperature, greater than 620° C. With multiple coatings, a film thickness as great as 30 μm can be obtained, providing sufficient mechanical strength to support devices built above it.

In general, adhesion between P2610 Series polyimide and various materials is poor, including materials such as titanium-tungsten, silicon, carbon, and silicon dioxide. To obtain better adhesion, an adhesion promoter is typically applied to a substrate before coating with a P2610 polyimide. Some adhesion promoters for polyimide include a combination of a silane group and an aromatic group. After the adhesion promoter is coated and subjected to a thermal cycle, the silane group is coupled to the support surface or substrate and the aromatic group is ready to bond to polyimide. A layer of adhesion promoter including these coupling agents can remain stable on a substrate for one to two days. When a P2610 polyimide is applied over the adhesion promoter, the imide groups in the polyimide are tightly bonded to the coupling groups after a curing process.

FIG. 12 illustrates, more specifically, a form of selective adhesion in which an adhesion promoter as described above is selectively modified to obtain attached and unattached regions. In cross-section 220, glass substrate 222 has a thin layer of an adhesion promoter 224 spin-coated on its surface and baked on a hotplate at 115° C. for 60 seconds, then subsequently baked in an oven at 120° C. for 15 minutes. The adhesion promoter can, for example, be VM 652, a product of HD MicroSystems™.

Cross-section 230 shows shadow mask 232, with an appropriate pattern, positioned over adhesion promoter 224 while an oxygen plasma treatment is applied at 50 W for 5 seconds. The oxygen plasma 234 removes adhesion promoter 224 in the exposed areas not covered by shadow mask 232.

In cross-section 240, polyimide layer 242 has been formed, such as by spin-coating onto substrate 222 a layer of P2611 and then baking on a hotplate at 90° C. for 3 minutes, then at 150° C. for 3 minutes. After deposition, polyimide layer 242 is cured at 450° C. for about one hour. Then, device layer 244 is fabricated on polyimide layer 242, such as with movable electrodes as described above.

Finally, cross-section 250 shows how the areas in which adhesion promoter 224 remains produce good attachments between polyimide layer 242 and substrate 222, while volume 252 can be produced in unattached regions where adhesion promoter 224 has been removed. Although it would be possible to completely separate the unattached region of polyimide 242 from substrate 222, such as by cutting off part of substrate 222 with attached portions of polyimide layer 224, the above applications illustrate the usefulness of volume 252 enclosed between polyimide 242 and substrate 222.

In addition to glass, other substrate materials suitable for a process like that in FIG. 12 include silicon, titanium-tungsten, doped amorphous silicon, and sputter carbon. In addition, the technique shown in FIG. 12 could be modified in various other ways, such as by removing adhesion promoter 224 with a different agent or selectively changing it in a way that makes it ineffective in attaching to polyimide layer 242. Another approach would be to cover regions of adhesion promoter 224 with a material that prevents adhesion of polyimide layer 242.

Figure 13:
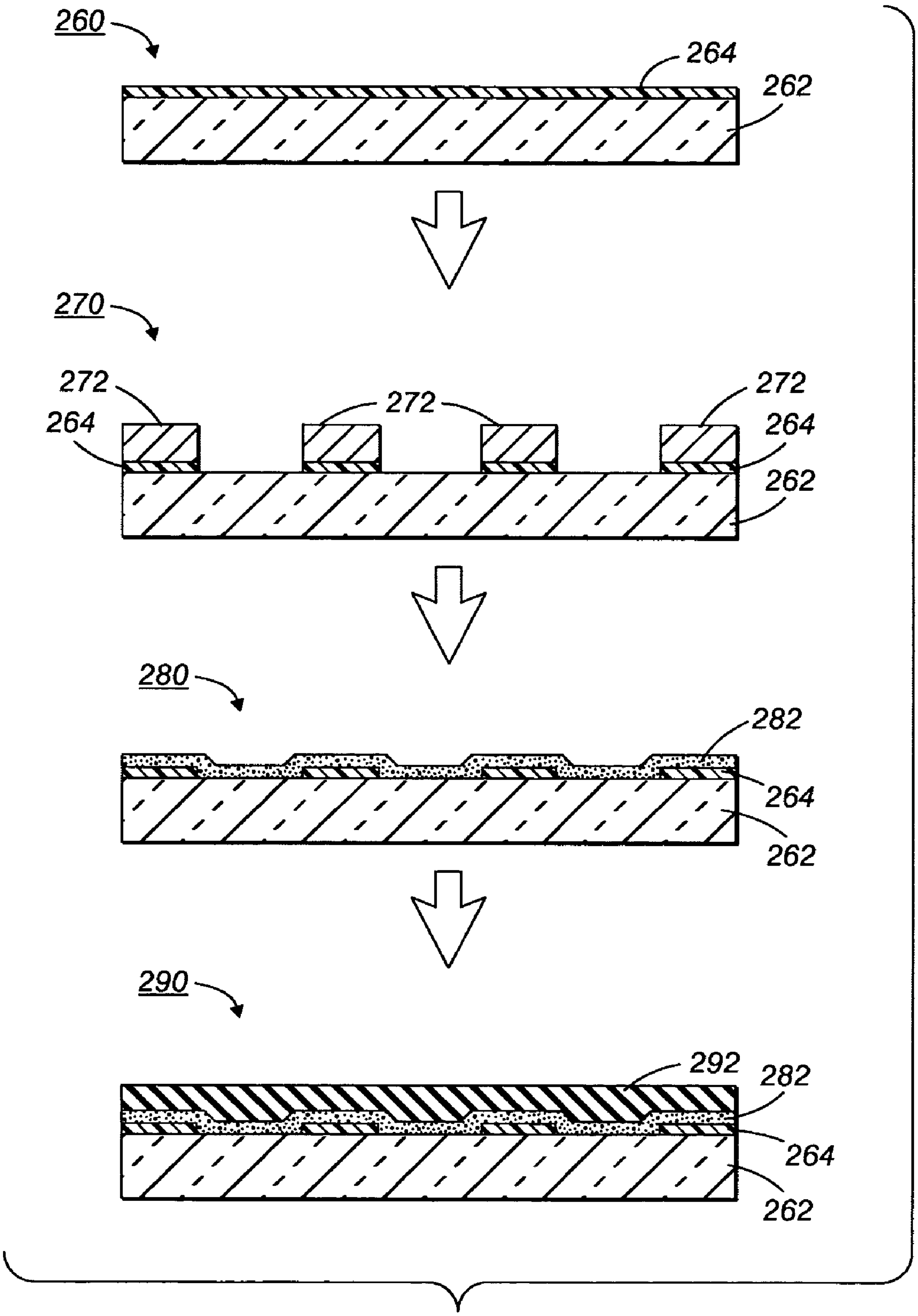
FIG. 13 shows cross-sectional views of stages in another process that produces a variable volume cell.

FIG. 13 illustrates another approach in which a material with poor adhesion is used between a substrate and an adhesion promoter. An example of such a material is fluorocarbon compound, which has a low surface energy and therefore poor adhesion to most materials.

Cross-section 260 in FIG. 13 shows substrate 262, which could be one of the materials mentioned above in relation to substrate 222 in FIG. 12. Fluorocarbon layer 264 has been deposited on a surface of substrate 262, such as in a MARCH plasma system with approximately 300 mtorr $CHF_3$ gas at 100 W plasma power for 4 minutes at room temperature, with no intentional heating.

In cross-section 270, mask 272 is positioned over fluorocarbon layer 264, such as by deposition and photolithographic patterning of a layer of photoresist. Then, fluorocarbon layer 264, where exposed, has been removed, such as with an oxygen plasma as in cross-section 230 in FIG. 12.

Cross-section 280 shows a stage in which mask 272 has been removed, and adhesion promoter 282 has been applied, which can be done in the same manner as in cross-section 220 in FIG. 12. At this point, adhesion promoter 282 is in direct contact with substrate 262 except in areas in which fluorocarbon layer 264 was not removed.

Finally, cross-section 290 shows polyimide layer 292 deposited over adhesion promoter 282. Polyimide layer 292 can be composed of P2611 as described above. After polyimide layer 292 is cured, it has good adhesion to promoter 282, but the regions in which fluorocarbon 262 are present have poor adhesion. Therefore, polyimide layer 292 can be released from substrate 262 in those areas by an appropriate technique, producing a variable volume as described above.

The technique in FIG. 13 could be modified in various ways, including the use of a carbon release layer as described in U.S. Pat. No. 5,034,972, incorporated herein by reference. In addition, similar techniques employing a sacrificial material such as a polymer could be used, as described in Bakir, M. S., Reed, H. A., Mulé, A. V., Jayachandran, J. P., Kohl, P. A., Martin, K. P., Gaylord, T. K., and Meindl, J. D., "Chip-to-Module Interconnections Using 'Sea of Leads' Technology," MRS Bulletin, January 2003, pp. 61-63 and 66-67, incorporated herein by reference.

Figure 14:
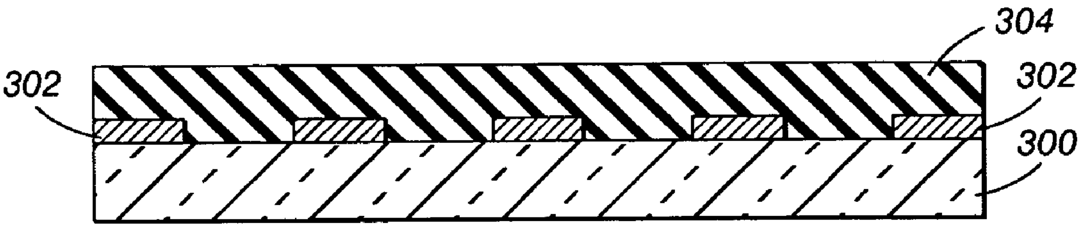
FIG. 14 is a cross-sectional view of a stage in another process that produces a variable volume cell.

FIG. 14 illustrates another example of selective adhesion, but with an inorganic material that has good adhesion to polyimide. Most inorganic materials, including oxides, semiconductors, and most metals, do not stick to polyimide films well. But certain materials have been found to adhere to polyimide, including gold and indium tin oxide (ITO). Therefore, selective adhesion can be obtained by depositing and patterning a layer of an inorganic material that adheres to polyimide on an appropriate substrate.

In FIG. 14, substrate 300 can be a suitable material to which gold or ITO adheres, such as silicon, glass, titanium-tungsten, or another metal. A layer of inorganic material such as gold or ITO has been deposited and photolithographically patterned to produce adhesion regions 302. Then, polyimide layer 304 has been deposited, such as a layer of P2611 as described above. Since polyimide layer 304 adheres well to adhesion regions 302 but does not adhere to substrate 300, unattached regions between regions 302 can be released, producing variable volumes as described above.

The technique in FIG. 14 could be modified in various ways, such as by using a poor adhesion film over substrate 300 to facilitate release of unattached areas between adhesion regions 302.

Figure 15:
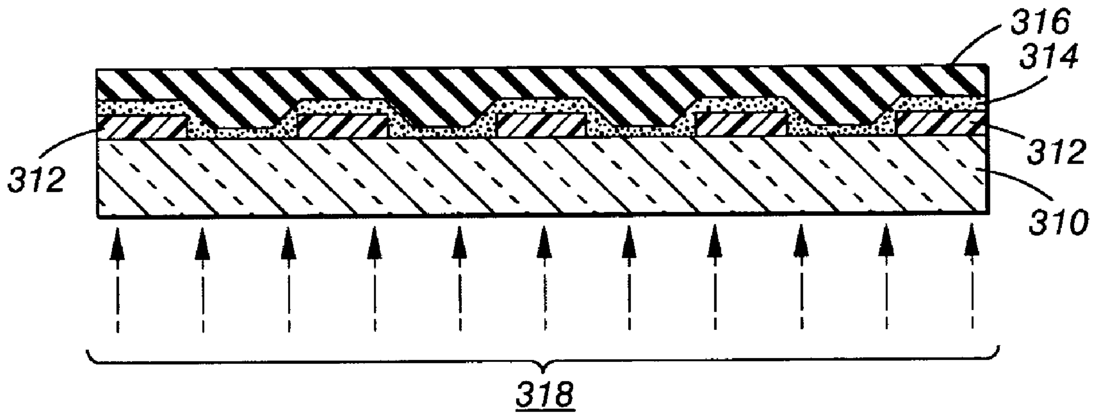
FIG. 15 is a cross-sectional view of a stage in another process that produces a variable volume cell.

FIG. 15 illustrates yet another approach, employing a release layer similar to the sacrificial material technique of Bakir, et al., incorporated by reference above.

In FIG. 15, substrate 310 is transparent to ultraviolet light. On its surface is a pattern of an ultraviolet light absorbing layer 312, such as a-Si:H. This layer can be deposited and patterned photolithographically or it could be sputtered or evaporated through a shadow mask. Then, a layer of adhesion promoter 314 is deposited over substrate 310, and finally polyimide layer 316 is deposited. Adhesion promoter 314 and polyimide layer 316 can be deposited and processed as described above. Finally, ultraviolet light 318, such as from an excimer laser, is applied through substrate 310, causing layer 312 to heat up and release polyimide layer 316 from substrate 310 in the areas where layer 312 is present. Because the volume of layer 312 is small, the energy required to release polyimide layer 316 is also small, so that the releasing process is highly efficient, whether performed by laser ablation or not.

The technique in FIG. 15 could similarly be modified, such as by using different types of exposure or laser scanning through the substrate and by using different materials. It may also be possible to use materials that are absorbent at different wavelengths to produce a similar effect.

Various other selective adhesion techniques may be used in addition to those described in relation to FIGS. 12-15. For example, it may be possible to use flexible substrates other than polyimide.

In addition to the applications described above, the techniques described above may be used in various other applications. For example, selective adhesion may be useful for various applications in which circuitry is formed on a flexible substrate, such as with the techniques described by Doany, F. E., and Narayan, C., "Laser release process to obtain free-standing multilayer metal-polyimide circuits," IBM J. Res. Develop., Volume 41, No. 1-2, January/March 1997, pp. 151-157, incorporated herein by reference. The applications described above generally provide a common electrode on a flexible substrate, but more complicated circuitry could be produced on the flexible substrate related to the positions of the cells of an array or to connections with peripheral circuitry.

In addition, selective adhesion may be useful for applications of micro-cells, including those described above in relation to FIGS. 4-11 and various others including micro-electro-mechanical systems (MEMS). Selective adhesion may be easier and less complicated than conventional techniques that integrate surface micromachining and/or bulk micromachining including building and etching sacrificial materials to produce three-dimensional structures.

Some of the above exemplary implementations involve specific materials, such as polyimide, but the invention could be implemented with a wide variety of materials and with layered structures with various combinations of sublayers. In particular, other polymer materials could be used to form flexible structures and a wide variety of materials could be used in substrates, device layers, insulating layers, electrodes, spacers, and top structures.

Some of the above exemplary implementations involve two-dimensional arrays of micro-cells, but the invention could be implemented with a single cell or with a one-dimensional array. Furthermore, the above exemplary implementations generally involve cells with movable electrodes on or in a flexible structure and with stationary electrodes above or below, but various other electrode arrangements could be used, such as with different numbers of electrodes, with different positioning, different operations, and so forth. The above exemplary implementations generally provide at least one duct for fluid communication with a variable volume, but implementations could be provide without a duct or with various other arrangements or combinations of ducts.

The above exemplary implementations generally involve production of cells following particular operations, but different operations could be performed, the order of the operations could be modified, and additional operations could be added within the scope of the invention. For example, as noted above, flexible structures and ducts could be produced in any of several different ways.

While the invention has been described in conjunction with specific implementations, it is evident to those skilled in the art that many alternatives, modifications, and variations will be apparent in light of the foregoing description. Accordingly, the invention is intended to embrace all other such alternatives, modifications, and variations that fall within the spirit and scope of the appended claims.

What is claimed is:

1. A cell comprising:

part of a support structure that has a support surface;

an adhesion structure that is on the support surface;

a flexible structure that includes a polymer layer coated over the support surface; the adhesion structure attaching the polymer layer to the support surface in a first region and not attaching the polymer layer to the support surface in a second region surrounded by the first region; the flexible structure, when unstretched, lying in a flat position with its lower side directly on the support surface in the second region; in response to stretching force away from the support surface in the second region, the flexible structure moving out of the flat position to provide a variable volume between the flexible structure and the support surface in the second region;

one or more electrodes; charge levels on the electrodes coupling with the variable volume and providing the stretching force; the electrodes including a lower electrode at the support surface; and signal circuitry that provides a signal path between at least one of the electrodes and external circuitry;

the adhesion structure including at least one of:

a patterned layer of adhesion promoter; the adhesion promoter being present in the first region and not present in the second region;

a patterned layer of fluorocarbon material; the fluorocarbon material being present in the second region and not present in the first region;

a patterned layer of inorganic material that adheres to the polymer layer; the inorganic material being present in the first region and not present in the second region; and a patterned layer of exposed ultraviolet light absorbing material and an adhesion promoter over the ultraviolet light absorbing material; the ultraviolet light absorbing material being present in the second region and not present in the first region;

the support structure including:

a substrate;

an insulating layer that includes the support surface, the support surface being disposed away from the substrate;

a device layer between the substrate and the insulating layer; and interconnecting material providing a conductive path from the lower electrode at the support surface through the insulating layer to the device layer; the signal circuitry providing the signal path through the interconnecting material and through the device layer.

2. The cell of claim 1 in which one of the support surface and the flexible structure has a duct defined therein in the second region, fluid flowing between the variable volume and an exterior region through the duct.

3. The cell of claim 1 in which the flexible structure includes a movable electrode that extends into the second region and the electrodes further include a set of one or more stationary electrodes, charge levels on the movable and stationary electrodes coupling with each other and with the variable volume.

4. The cell of claim 3 in which the set of stationary electrodes includes the lower electrode at the support surface in the second region.

5. The cell of claim 3 in which the set of stationary electrodes includes an upper electrode over the flexible structure in the second region.

6. The cell of claim 3 in which the signal circuitry provides a signal path between at least one of the stationary electrodes and the external circuitry.

7. The cell of claim 1 in which, in response to the external circuitry, the signal circuitry further provides signals to control charge level on at least one of the electrodes.

8. The cell of claim 1 in which the signal circuitry further provides signals to the external circuitry indicating charge level on at least one of the electrodes.

9. The cell of claim 1 in which the second region's area on the support surface is not greater than approximately 1 $mm^2$.

10. Apparatus comprising:

a support structure with a support surface;

an elastically flexible structure on the support surface; the flexible structure being attached to the support surface in an attached region; the flexible structure being unattached to the support surface in one or more cell regions, each surrounded by the attached region; the flexible structure, when unstretched, lying in a flat position with its lower side directly on the support surface in each cell region; in response to stretching force away from the support surface in a cell region, the flexible structure moving out of the flat position to provide a variable volume between the flexible structure and the support surface in the cell region;

for each cell region, one or more respective electrodes; charge levels on each cell region's electrodes coupling with the cell region's variable volume; each cell region's electrodes including a respective lower electrode at the support surface; and for each cell region, respective signal circuitry providing a respective signal path between at least one of the cell region's electrodes and external circuitry;

the support structure further including:

a substrate;

an insulating layer that includes the support surface, the support surface being disposed away from the substrate;

a device layer between the substrate and the insulating layer; and for each cell region, respective interconnecting material providing a conductive path from the respective lower electrode at the support surface through the insulating layer to the device layer; each cell region's signal circuitry providing the respective signal path to external circuitry through the respective interconnecting material and through the device layer.

11. The apparatus of claim 10 in which, for each cell region, one or more ducts are defined in the support structure or in the flexible structure, the cell region's ducts permitting fluid communication with the cell region's variable volume.

12. The apparatus of claim 10, further comprising:

peripheral circuitry at the support surface outside the attached region; the peripheral circuitry having signal communication with each cell region's lower electrode through the device layer.

13. The apparatus of claim 12 in which the peripheral circuitry provides signals through the device layer to control charge level on each cell region's lower electrode; each cell region's charge level affecting the flexible structure's position in the cell region.

14. The apparatus of claim 12 in which the peripheral circuitry receives signals through the device layer indicating charge level on each cell region's lower electrode; each cell region's charge level indicating position of the flexible structure in the cell region.

15. The apparatus of claim 10 in which the apparatus is an optical modulator; the apparatus further comprising a transparent top structure over the flexible structure; for each cell region, the flexible structure having a reflective upper surface area.

16. The apparatus of claim 10 in which the apparatus is a display; each cell region's electrodes including a reflective lower electrode on the support surface; each cell region's variable volume being connected through a duct to a fluid reservoir that contains a light absorbent fluid.

17. The apparatus of claim 10 in which the apparatus is a printhead in which each cell region ejects droplets in response to signals from the external circuitry to the cell region's electrodes; each cell region's electrodes including:

a first electrode that, when signaled, changes the cell region between the flat position and an open position; and a second electrode that, when signaled while the cell region is in the open position, causes droplet ejection.

18. The apparatus of claim 10 in which the apparatus is a microphone in which each cell region's lower electrode provides readout signals to the external circuitry; each cell region having a resonance frequency at which it converts sound wave energy to readout signals.

19. Apparatus comprising:

a support structure with a support surface;

an elastically flexible structure on the support surface; the flexible structure being attached to the support surface in an attached region; and an array that includes two or more cell regions, each including a respective part of the support surface and a respective part of the flexible structure; each cell region's respective part of the flexible structure being unattached to the support surface, each cell region being surrounded by the attached region; the flexible structure, when unstretched, lying in a flat position with its lower side directly on the support surface in each cell region; in response to stretching force away from the support surface in a cell region, the flexible structure moving out of the flat position to provide a respective variable volume between the flexible structure and the support surface in the cell region;

each cell region further including:

one or more respective electrodes; charge levels on each cell region's electrodes coupling with the cell region's variable volume and providing the stretching force; each cell region's electrodes including a respective lower electrode at the respective part of the support surface; and respective signal circuitry providing a respective signal path between at least one of the cell region's electrodes and external circuitry;

the apparatus being one of:

an optical modulator that further includes a transparent top structure over the flexible structure; for each cell region, the flexible structure having a reflective upper surface area;

a display; each cell region's lower electrode being a reflective lower electrode on the support surface; each cell region's variable volume being connected through a duct to a fluid reservoir that contains a light absorbent fluid;

a printhead in which each cell region ejects droplets in response to signals from the external circuitry to the cell region's electrodes; each cell region's electrodes including:

a first electrode that, when signaled, changes the cell region between the flat position and an open position; the first electrode being the cell region's lower electrode; and a second electrode that, when signaled while the cell region is in the open position, causes droplet ejection; and a microphone in which each cell region's lower electrode is on the support surface and provides readout signals to the external circuitry; each cell region having a respective wavelength range in which it converts sound wave energy to readout signals; the respective wavelength ranges of the cell regions being in a spectrum;

the support structure further including:

a substrate;

an insulating layer that includes the support surface, the support surface being disposed away from the substrate;

a device layer between the substrate and the insulating layer; and for each cell region, respective interconnecting material providing a conductive path from the respective lower electrode at the support surface through the insulating layer to the device layer; each cell region's signal circuitry providing the respective signal path to external circuitry through the respective interconnecting material and through the device layer.

20. A cell comprising:

part of a support structure that has a support surface;

a flexible structure that includes a polymer layer deposited over the support surface; the polymer layer being attached to the support surface in a first region; the polymer layer being unattached to the support surface in a second region surrounded by the first region; the flexible structure, when unstretched, lying in a flat position with its lower side directly on the support surface in the second region; in response to stretching force away from the support surface in the second region, the flexible structure moving out of the flat position to provide a variable volume between the flexible structure and the support surface in the second region;

one or more electrodes; charge levels on the electrodes coupling with the variable volume and providing the stretching force; the electrodes including a lower electrode at the support surface; and signal circuitry that provides a signal path between at least one of the electrodes and external circuitry;

the support structure including:

a substrate;

an insulating layer that includes the support surface, the support surface being disposed away from the substrate;

a device layer between the substrate and the insulating layer; and interconnecting material providing a conductive path from the lower electrode at the support surface through the insulating layer to the device layer; the signal circuitry providing the signal path through the interconnecting material and through the device layer.

21. The cell of claim 20, further comprising:

an adhesion structure on the support surface; the adhesion structure attaching the polymer layer to the support surface in the first region and not attaching the polymer layer to the support surface in the second region.

22. The cell of claim 21 in which the adhesion structure comprises an adhesion promoter that is exposed to plasma treatment in the second region and that is not exposed to plasma treatment in the first region.

23. The cell of claim 21 in which the adhesion structure comprises a patterned layer of fluorocarbon material; the fluorocarbon material being present in the second region and not present in the first region.

24. The cell of claim 21 in which the polymer layer includes a polyimide film; the adhesion structure comprising a patterned layer of inorganic material that adheres to the polyimide film; the inorganic material being present in the first region and not present in the second region.

25. The cell of claim 21 in which the adhesion structure comprises a patterned layer of exposed ultraviolet light absorbing material and an adhesion promoter on the ultraviolet light absorbing material; the exposed ultraviolet light absorbing material being present in the second region and not present in the first region.

26. An array comprising:

part of a support structure that has a support surface;

a flexible structure on the support surface; the flexible structure being attached to the support surface in an attached region; the flexible structure being unattached to the support surface in each of two or more cell regions, each surrounded by the attached region; the flexible structure, when unstretched, lying in a flat position with its lower side directly on the support surface in each cell region; in response to stretching force away from the support surface in a cell region, the flexible structure moving out of the flat position to provide a variable volume between the flexible structure and the support structure; the flexible structure including a common movable electrode that extends into each of a set of two or more of the cell regions; and for each cell region in the set, cell circuitry including:

a set of one or more stationary electrodes; charge levels on the cell's stationary electrodes and on the common movable electrode coupling with each other and with the cell region's variable volume and providing the stretching force; each cell region's stationary electrodes including a respective lower electrode at the support surface; and signal circuitry that provides a signal path between at least one of the stationary electrodes and external circuitry;

the support structure including:

a substrate;

an insulating layer that includes the support surface, the support surface being disposed away from the substrate;

a device layer between the substrate and the insulating layer; and for each cell region, respective interconnecting material providing a conductive path from the lower electrode at the support surface through the insulating layer to the device layer; the signal circuitry providing the respective signal path through the respective interconnecting material and through the device layer.

27. The array of claim 26 in which the common movable electrode extends into all of the cell regions in the array.

28. The array of claim 26 in which the flexible structure further includes a lower polymer layer under the common movable electrode.

29. The array of claim 28 in which the flexible structure further includes an upper polymer layer over the common movable electrode.

* * * * *